United States Patent [19]
Marston et al.

[11] Patent Number: 5,268,842
[45] Date of Patent: Dec. 7, 1993

[54] ELECTRONIC CONTROL OF ENGINE FUEL INJECTION BASED ON ENGINE DUTY CYCLE

[75] Inventors: Cary J. Marston, Columbus; Jeffrey P. Seger, Greenwood; Andrew C. Rosselli; Leslie A. Roettgen, both of Columbus, all of Ind.

[73] Assignee: Cummins Engine Company, Inc., Columbus, Ind.

[21] Appl. No.: 620,782

[22] Filed: Dec. 3, 1990

[51] Int. Cl.$^5$ .............................................. F02D 41/04
[52] U.S. Cl. .......................... 364/431.05; 364/431.07; 123/480; 123/488
[58] Field of Search .............. 364/431.05, 431.07, 364/431.08; 123/480, 492, 493, 488

[56] References Cited

U.S. PATENT DOCUMENTS

| | | | |
|---|---|---|---|
| 4,368,705 | 1/1983 | Stevenson et al. | 123/357 |
| 4,379,332 | 4/1983 | Busser et al. | 364/431.05 |
| 4,531,672 | 7/1985 | Smith | 123/446 |
| 4,619,234 | 10/1986 | Okamoto | 123/357 |
| 4,691,286 | 9/1987 | Obayashi et al. | 364/431.04 |
| 4,709,335 | 11/1987 | Okamoto | 364/431.05 |
| 4,737,914 | 4/1988 | Abe et al. | 364/431.04 |
| 4,837,698 | 6/1989 | Amano et al. | 364/431.05 |
| 4,843,556 | 6/1989 | Wakeman et al. | 364/431.08 |
| 4,862,369 | 8/1989 | Yakuwa et al. | 364/431.05 |
| 4,899,280 | 2/1990 | Onari et al. | 364/431.05 |
| 4,899,282 | 2/1990 | Holmes | 364/431.08 |
| 4,911,127 | 3/1990 | Perr | 123/446 |
| 5,065,328 | 11/1991 | Abo et al. | 364/431.07 |
| 5,099,429 | 3/1992 | Onari et al. | 364/431.05 |

Primary Examiner—Vincent N. Trans
Attorney, Agent, or Firm—Sixbey, Friedman, Leedom & Ferguson

[57] ABSTRACT

A control system for controlling fueling and/or timing of a fuel injector in an internal combustion engine. Fuel injection is controlled based upon the recent operating history of the engine. In particular, the difference between the instantaneous speed and the average speed over a previous predetermined period are compared and the difference is utilized in determining a control variable which in turn can be used for selecting fueling and/or timing values. The difference between the instantaneous fueling and the average fueling over a predetermined period can also be used in selecting the control variable. The fuel injector fueling and/or timing is determined utilizing fueling and/or timing values from at least two maps, with the control variable determining the proportions of the timing/fueling valves to be utilized in determining commanded timing/fueling. The control variable may also be set to a fixed value under certain conditions such as during operation on a governor, or where the operator selects an override function.

52 Claims, 6 Drawing Sheets

ELECTRONIC CONTROL OF ENGINE FUEL INJECTION BASED ON ENGINE DUTY CYCLE

TECHNICAL FIELD

The invention relates to fuel injection systems and, particularly to controls for fuel injectors based on engine operating conditions. In particular, in accordance with the present invention, based on the engine duty cycle or the operating history of the engine, the fuel injection timing and/or quantity of fuel is controlled in a manner which accommodates changing from one operating mode or set of conditions to another.

BACKGROUND

Electronic fuel injection systems are well known in the art. Generally, the electronic control is utilized to determined the appropriate amount of fuel which is injected, as well as the appropriate timing of the injection for most effective combustion of the injected quantity. An electronic control module receives information from various sensors which indicate the engine operating conditions, for example, the operator's request (throttle position), the vehicle speed, intake manifold pressure, etc., and the amount of fuel is determined based upon the received information. The appropriate injection timing is also determined by the control module based upon various operating conditions including (in addition to those mentioned above) the fuel quantity (fueling) to be injected. The fueling and timing are updated periodically to correct or adjust the timing as the operating conditions change. Typically, the electronic control unit also includes maximum limits for timing and fueling to ensure that the maximum rated loads of various engine components are not exceeded.

It is constantly a goal to provide an improved control system for engine fueling (i.e., fuel quantity) and timing to make most efficient use of the fuel injected, thereby improving the fuel economy. In addition, it is extremely important to control fueling and timing to minimize exhaust pollutants and meet increasingly stringent emissions standards. Proper fueling and timing is also necessary to prevent engine overloads thereby avoiding repairs and improving the durability of the engine.

U.S. Pat. No. 4,379,332 to Busser et al. discloses an electronic fuel injection system in which a plurality of sensors provide operating information to an electronic control unit, which then computes the fueling and timing operation of the fuel injectors. In determining the fuel quantity parameter, the lesser of a full load fuel quantity and a percent load fuel quantity is selected, with the percent load fuel quantity determined by the sum of a proportional component and an integral component. The proportional component is calculated as a function of the actual engine speed and a commanded engine speed, and the integral component is related to a cumulative speed error, with the speed error defined as the difference between the commanded speed and actual speed signals. The timing is obtained by summing first and second quantities, one of which is a function of the actual engine speed and the calculated fuel quantity, and the other is a function of air temperature. The above proportional components, full load quantity, and first and second timing quantities utilize two or three dimensional surfaces (graphs or maps) which are interpolated for various inputs of the electronic control unit. Thus, Busser et al. perform a series of computations and combine calculated and mapped values to arrive at final calculated fuel injection quantity and timing values.

Often, it is difficult, if not impossible, to utilize complex computations to achieve the most desirable fueling and timing for a wide range of operating conditions, particularly where emissions standards, fuel economy and engine durability are important concerns The primary difficulty in utilizing formulae for calculating fueling and timing resides in deriving a mathematical relation which accurately models actual engine operation, and which can accommodate or evaluate trade offs associated with economy, performance, emissions and durability requirements. The use of three dimensional graphs, maps or look-up charts can be particularly useful where it is desired to select fueling and timing values which are empirically known to be particularly suitable for various sets of operating conditions. Utilizing maps or tables, the engine fueling and timing can be selected based upon known values which more optimally achieve certain characteristics, e.g. performance, while operating within other restraining characteristics, e.g. emissions or economy. However, even utilizing maps or tables, it is extremely difficult to include all possible sets of operating conditions or to consider all factors relevant to controlling fuel injection.

U.S. Pat. No. 4,368,705 to Stevenson et al. discloses an engine control system in which a series of maps are utilized to control the timing, with the map selection based on the mode of operation of the engine. A timing map selector is provided which receives signals from various engine sensors and in response, selects a particular map for control of the timing. The timing is then determined for the corresponding operating conditions within the selected mapped timing relation. Thus, a wider range of conditions or situations can be considered since separate maps are provided for different operating modes.

In Stevenson et al., basically four operating maps are provided. One map is utilized for initial engine operation to accommodate for operation of a cold engine. A transient map is selected where the operator has made a substantial change in the throttle position indicating the operator desires significant acceleration or deceleration. In addition, urban and highway maps are also provided.

However, the control system required for selecting a particular map can be extremely complicated and it is possible that certain conditions or driving habits could cause an erroneous map selection. For example, in Stevenson et al. an urban condition detector generates a signal upon concurrence of a throttle position change signal and an engine speed change signal, and the signals from the urban condition detector are then counted. If the count exceeds a predetermined number during a preset time period, an urban driving map is selected. A highway map is selected where the count is below the predetermined number. A nervous or fidgety driver may often change speeds and throttle positions even during highway driving, yet due to the urban detector, an urban driving map may be selected.

Another difficulty with the Stevenson et al. arrangement is that a slight change in operating conditions may change the selected map which may cause a more dramatic change in the performance or response of the engine than the change in conditions would warrant. For example, where the count (by the urban detector) of concurrent speed change and throttle position change shifts from just below the predetermined number to just above the predetermined number, a significant change in the performance or response of the engine could result (as the selected map changes) from only a small change in engine operating conditions or commands by the driver.

Whether a single map or a plurality of maps is utilized, each map must accommodate a range of conditions. For example in Stevenson et al., the highway/urban maps must accommodate speed change conditions for the ranges on either side of the predetermined count number, and the maps must therefore be somewhat conservative in approaching performance limits to accommodate constraints with regard to durability, economy or emissions. Thus, while the use of several maps is advantageous in that additional factors may be accounted for in selecting a map which is more desirable for a determined mode of operation, each map must nevertheless accommodate a range of conditions within a particular mode. Furthermore, a small change in the operating conditions may result in a determination that the operational mode has changed resulting in a magnitude of response which is larger than the actual change of operation.

As an illustration of the difficulty in accommodating numerous different conditions and in selecting a correct map, in determining whether the transient map is to be utilized, the selector in Stevenson et al. simply determines whether a dramatic change has been requested, not the magnitude of the change or its relation to previous engine operation (i.e., how the present operating conditions compare to operating conditions over a recent period of time). Thus, as long as the change is above a certain predetermined value, such that it is "dramatic," the response in selecting the transient mapped values is the same regardless of how "dramatic" or extreme the change is. Where the change is only slightly below the predetermined value, the condition is treated as non-transient, even though it may be very similar to conditions where the change is just above the predetermined "dramatic" value which is handled by the transient map.

Further, in Stevenson et al., the transient map is selected only for a large or substantial change in throttle position, and the urban map is selected only where speed and throttle position change concurrently in sufficient frequency. The steady highway map is selected where throttle position change is not substantial, and where throttle changes are not accompanied by speed changes of sufficient frequency. However, such a categorization by the map selector may result in selection of an urban condition map where the operator has changed the throttle position to accommodate for upgrades and downgrades if it is accompanied by a concurrent speed change, even though such a condition might more appropriately be treated as transient or highway. In addition, a somewhat transient condition may exist even when the throttle position is constant, for example where the speed changes significantly as a result of upgrades and downgrades, however the transient map would not be selected, since in Stevenson et al. only a substantial change in throttle position is utilized as a basis for selecting the transient map.

As demonstrated above, complicated systems have been developed for controlling fuel injection to accommodate a variety of operating conditions. However, it continues to be a goal to develop improved systems for controlling fuel injection which can react to a wide range of operating conditions, such that most effective use can be made of the fuel while providing more optimal operation considering durability, performance, emissions and economy requirements.

SUMMARY AND OBJECTS OF THE INVENTION

It is therefore an object of the present invention to provide an improved electronic control system for controlling fuel injection which controls the fuel quantity and/or timing in response to a wide range of operating conditions.

It is another object of the invention to provide an electronically controlled fuel injection system which utilizes a four dimensional map system. In particular, it is an object of the present invention to select fuel injection values, for example, to control timing, in which values are selected from at least two three-dimensional maps in response to a plurality of sensed conditions. A control variable is also calculated and utilized to interpolate between the values obtained from the two maps, such that the control variable essentially acts as a fourth dimensional variable.

It is a further object of the present invention to provide a fuel injection control system in which the timing is adjusted to accommodate for transient conditions, with both speed and fueling changes considered as factors in determining the amount of adjustment for a transient state.

It is another object of the invention to provide a fuel injection control system in which the magnitude of speed and/or fueling changes can be considered in determining the amount of timing adjustment as compared to a steady state condition.

It is a still further object of the present invention to provide a fuel injection control system in which information regarding the speed and/or fueling over a previous period of time is utilized in determining the timing or timing change from a steady state condition. In particular, averaged timing and/or fueling values are calculated for a previous predetermined time interval, and compared with a present speed and/or fueling value to provide speed difference and/or fueling difference values. After a change in conditions, the average value (which continues to be updated) lags behind the instantaneous value such that not only is the instantaneous magnitude of the change taken into consideration, but also the amount of time it has been since such a change has taken place. Thus, in accordance with the present invention, recent operating history is considered in determining the degree of transience.

It is yet another object of the present invention to provide a fuel injection control system in which the timing is determined with reference to steady state and transient timing maps, with the timing value selected by interpolating between the steady state and transient timing maps based upon the degree of transience.

As a further object of the present invention, a variable representative of the degree of transience is determined based upon one or both of fueling and speed changes, with the changes evaluated based upon a comparison of the present fueling and speed data with speed and fueling data of the recent engine operating history (i.e., the averaged data over a preceding period of time).

These and other objects and advantages are achieved in accordance with the present invention in which an injection timing value is selected utilizing a pair of three-dimensional maps. In particular, the engine speed and fueling are utilized as inputs for each of the maps, and timing value is then derived from each map for the speed and fueling values The timing value represents the time relative to top dead center (TDC) at which the injector solenoid closes, which in turn determines the time at which fuel is injected. The timing is determined/measured in terms of angular positioning of the camshaft or crankshaft.

In a preferred embodiment, one timing map is utilized to correspond to steady state operation, and another is utilized to correspond to more transient conditions. The actual timing value which is utilized is dependent upon a control variable which represents the degree of transience of the present operating conditions. In particular, the control variable is determined, and utilized as an interpolating factor which varies between zero and one, with one representing the steady state operation for which the steady state map value is utilized; zero representing transient conditions for which the transient map is utilized; and values between zero and one utilized to interpolate between the steady state and transient values.

The control variable is determined based upon changes in the engine speed and/or changes in the fueling (fuel quantity). The speed and/or fueling changes utilized for determining the control variable depend not only upon the magnitude of the changes, but also the amount of time which has elapsed since a speed and/or fueling change has occurred. In particular, the instantaneous fueling and/or speed is compared with an average of fueling and speed values representing the recent operating history of the engine. Since the average value(s) will gradually move to the new value for speed and fueling, the difference will gradually diminish, such that upon a change from one operating condition to another, initially a larger transient indication will be provided. However, after operating at the new operating conditions, the average will gradually assume that of the new operating condition(s) and the control variable correspondingly moves toward one (i.e., where the change is from one substantially steady operating condition to a second substantially steady operating condition).

For example, if an engine has been operating steadily at 1,000 rpm, and suddenly shifts to 2,000 rpm, the initial speed difference will be 1,000 rpm. The speed difference can then be utilized to select a control variable which is then utilized for interpolating between the steady state and transient maps to provide fueling and/or timing commands to control fuel injection. If the speed then remains at 2,000 rpm over a period of time, the average speed will gradually rise to 2,000, such that the speed difference will become zero and the timing value gradually returns to the steady state map. Thus, in response to a transient condition, for example a sudden change of speed, the timing is adjusted in consideration of not only the magnitude of the speed change, but also as to the time elapsed since the speed change occurred. In the present invention, a greater accommodation for a transient condition is provided as soon as the transient condition occurs, and, as a result of the averaging, the shift towards the steady state map is gradual rather than sudden. In addition, the amount of change in the timing value in response to a transient state depends upon the magnitude of the change (e.g., the magnitude of a speed difference, for example), with a greater response (i.e. more toward the transient map) for larger changes in fueling and/or speed.

The control variable can be selected from a two dimensional map, with the speed difference as the first dimension input and the control variable as the second dimension output. In addition, the control variable may be selected from a three dimensional map if desired, with the control variable selected based upon both a speed difference and a fueling difference. The fueling difference is obtained in a manner similar to the speed difference, with the current fueling compared with the averaged fueling over a previous predetermined period. Thus, by using the control variable in interpolating between steady and transient maps, not only can both fueling and timing changes be considered, but also their magnitudes and the time elapsed since the change(s) have occurred. As a result, a distinction may be made between situations where fueling is constant while speed increases rapidly (for example, in a downhill situation) as compared to a situation where a speed increase is accompanied by an increase in the fueling. Even where a two-dimensional map is utilized, the present invention can realize advantages in utilizing magnitude and time considerations in determining the response to a transient condition. The base value for the fueling can also be determined utilizing a two map system, with the fueling value interpolated between the maps depending upon a control variable, with the control variable selected based upon speed differences and/or fueling differences.

Other objects and advantages of the present invention will become apparent from the following detailed description when read in conjunction with the drawings, in which.

DETAILED DESCRIPTION OF THE PREFERRED EMBODIMENT

Figure 1:
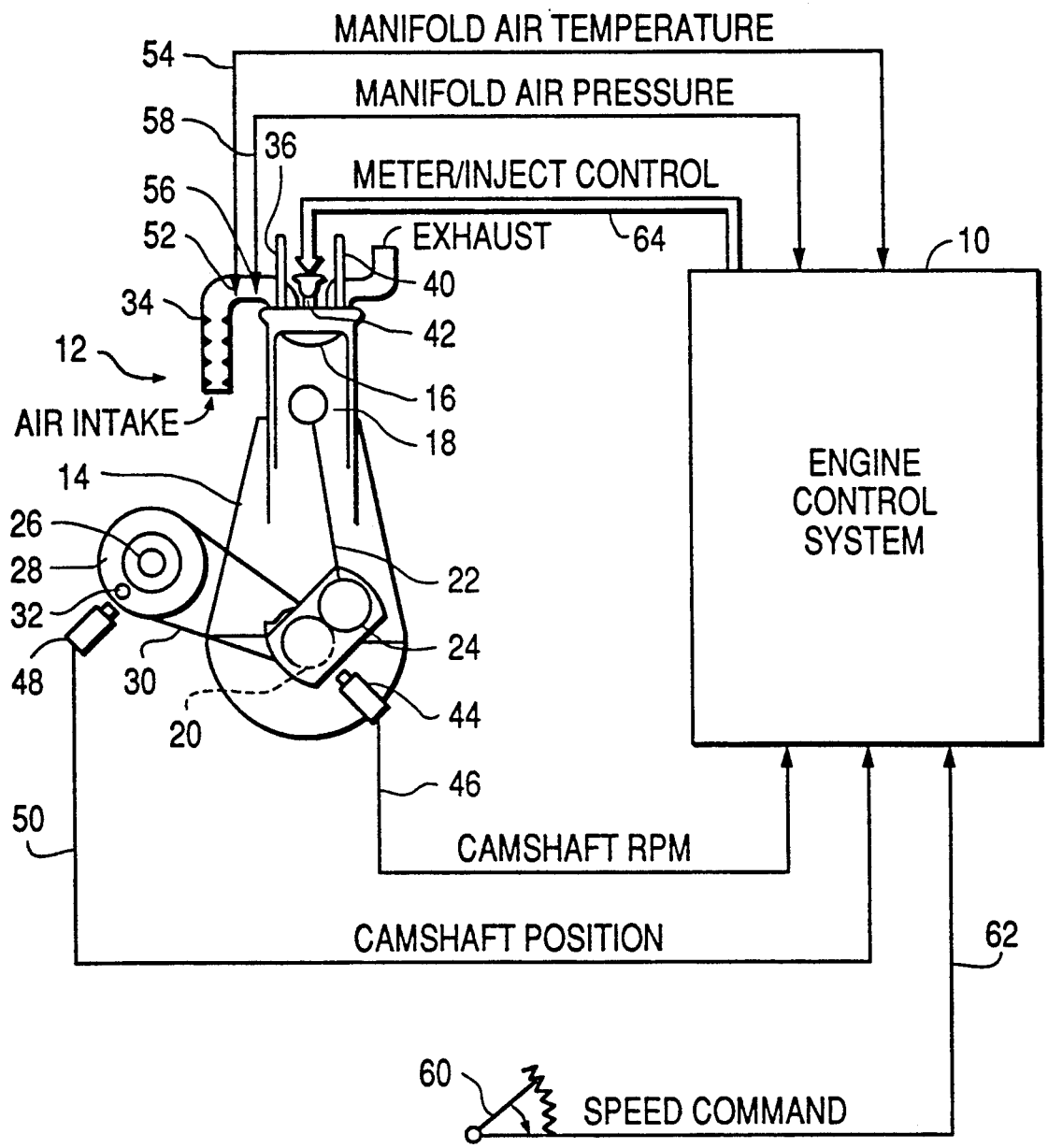
FIG. 1 schematically illustrates an electronically controlled fuel injection system.

FIG. 1 schematically depicts the major components of an electronically controlled fuel injection system. For illustrative purposes, only one fuel injector 42 is shown, however, it is to be understood that least one injector is provided for each cylinder. The system includes a control system 10 which includes the control logic and associated injector circuitry. The control system controls injection for a standard compression ignition or diesel engine 12 which includes an engine block 14 and a plurality of cylinders, as shown for example at 16. A piston 18 is reciprocable within the cylinder 16, with the piston connected in driving relation to a crankshaft 20. The connection is effected by a rod 22 coupled to a crank 24 mounted on the crankshaft 20. The rate at which the piston 18 reciprocates within the cylinder 16 is directly related to the angular velocity or rpm of the crankshaft 20.

A camshaft 26 is coupled to the crankshaft 20 and rotates in timed relation therewith. The camshaft 26 has an associated gear 28 mounted thereon, with the gear 28 connected to a gear (not shown) on the crankshaft 20 by known means such as a gear train or, as shown in FIG. 1, a timing chain 30. Crankshaft and camshaft pulleys or timing gears provide a desired driving relationship such that the camshaft rotates at a desired angular velocity, i.e. one-half the angular velocity of the crankshaft.

The compression ignition engine 12 includes an air intake manifold that branches off into a duct or line 34 for each of the cylinders. The control of air flow through the line 34 to the cylinder 16 is controlled by an intake valve 36. The intake valve 36 is of conventional design and operation and is mechanically actuated by a cam on the camshaft 26. Generally, a turbocharger (not shown) will be provided to boost or increase the intake manifold pressure. The exhaust 12 includes an exhaust manifold having an exhaust duct or line 38 for each of the engine cylinders. The flow of exhaust from the cylinder 16 through the exhaust line 38 is controlled by an exhaust valve 40. The exhaust valve 40 is similar to the intake valve 36 and is of conventional design, operated and mechanically actuated by a cam on the camshaft 26.

An electromagnetic injector 42 is mounted on the head of the cylinder 16. The injector 42 is actuated to inject a pulse or charge of fuel into the cylinder. The principal objective of the engine control system 10 is to control the time at which the injector 42 injects fuel, and the quantity of fuel that is injected into each cylinder during the engine operating cycle.

The injector can have a cam-plunger arrangement which, together with an injector solenoid, carries out the desired injector operation. With the solenoid closed, as the plunger is retracting (i.e. as actuated by the metering ramp portion of the cam) fuel is drawn into the injector. Opening of the solenoid halts the flow of fuel into the injector. Thus the time at which the solenoid opens determines the fuel quantity delivered to the injector. The injection ramp portion of the cam will then force the plunger downward and, after the solenoid closes, the plunger forces the fuel into the engine. Thus, in the cam-plunger arrangement, the time at which the solenoid valve opens (TVO) determines the fuel quantity, while the time at which the solenoid closes (TVC) determines the injection timing.

A dual solenoid injector may also be utilized, which generally includes a first solenoid to control fuel quantity or metering, and a second solenoid to control injection timing. The first solenoid is actuated to permit pressurized fuel to enter into an internal chamber within the injector, and the solenoid is then released to stop flow into the chamber. The second solenoid is subsequently actuated at the appropriate injection time to vent the internal chamber and permit the pressurized fuel contained therein to flow into the engine cylinder associated with the injector. It is to be understood that aspects of the present invention are applicable to a variety of fuel injector or other fuel delivery systems in which the fuel quantity and/or the timing of fuel delivery into the engine are controlled. Examples of such systems are in-line and rotary fuel pump systems.

A number of sensors or transducers are utilized to monitor various conditions of the engine and to provide engine operating information to the electronic control system. The sensed information is utilized as input data for ascertaining the actual fuel quantity and the advanced timing desirable for each engine cylinder.

The sensors include an angular velocity sensor 44 which detects the angular velocity of the crankshaft 20 representative of the engine speed or RPM. The crankshaft 20 generally will be provided with a plurality of equally spaced marks over its circumference, to provide a position output from the sensor 44 with each mark corresponding to a certain amount of crankshaft rotation, e.g. 30 degrees where 12 marks ares spaced about the shaft or one degree where 360 marks/features are spaced about the shaft. The pulses from the sensor 44 are communicated to the engine control system 10 utilizing a signal line 46.

Mounted in proximity to the crankshaft pulley 28 is a sensor 48, which functions to provide an absolute engine position signal for each cycle of the engine. For example, the sensor 48 can provide a reference pulse for each 720 degrees of crankshaft revolution, and may take the form of a conventional magnetic pickup. The camshaft pulley 28 includes a timing mark 32 on its surface which is sensed by the sensor 48 to produce an absolute engine position pulse for each 360 degrees of camshaft revolution (for example, where the ratio of crankshaft to camshaft revolution is 2:1). The absolute engine position reference pulse is communicated to the control system 10 by signal line 50.

Alternatively, a single sensing device can be utilized on the camshaft (i.e. without a crank sensor 44) with crank angle information derived from the known 2:1 driving relationship. In this arrangement features located about the camshaft, for example at 30 degree intervals, are sensed and recognized by the controls as 15 degrees of crank rotation.

The speed and positional information is utilized not only in determining the present operating condition, but also in the controlled or commanded functions of the control system In other words, when the control system determines the desired fueling, the command is carried out by opening the solenoid (in a single solenoid arrangement for example) at the appropriate crank angle position relative to top dead center. Similarly, the timing, determined by the control system, is carried out with reference to crankshaft positional information.

Temperature sensor 52 may also be provided, mounted in the engine air intake manifold 34 to provide the control system with the temperature of the air in the intake manifold which can affect combustion in terms of expansion of gases during combustion and in evaluating the amount of air which is present at a particular intake manifold pressure. The temperature signal is communicated via signal line 54. Additional temperature sensors could also be provided in the form of coolant and/or exhaust temperature sensors, which can limit fuel quantity if the engine is operating at high temperatures, to prevent damage due to overheating.

The intake manifold air pressure is sensed at 56 and communicated to the control system by line 58. The engine speed or fuel request from an operator is also detected by sensor 60, which provides a signal indicative of throttle position, with the throttle position communicated to the control system by signal line 62.

The engine control system 10 produces and transmits signals which are communicated by lines 64. The signals control fuel quantity (often referred to as fueling or metering) by controlling the actuation time of the first solenoid of the dual solenoid injector valve. The signals also control the injection advanced timing, by controlling actuation of the second solenoid of the dual solenoid injector valve. As noted earlier, the timing is often determined with reference to the position (generally measured in terms of the shaft angle position in degrees) relative to the top dead center position.

Figure 2A:
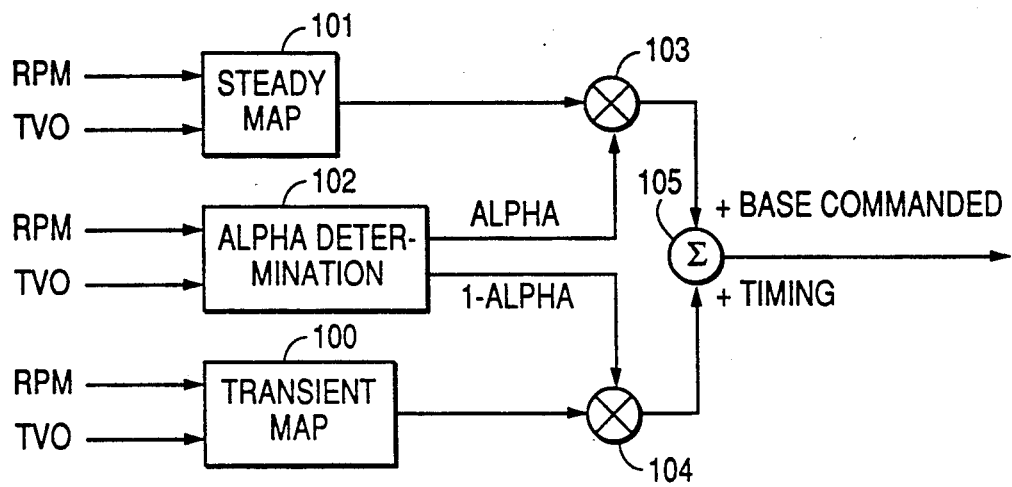
FIG. 2A and 2B are flow diagrams showing the basic logic utilized in determining timing and fueling values.
Figure 2B:
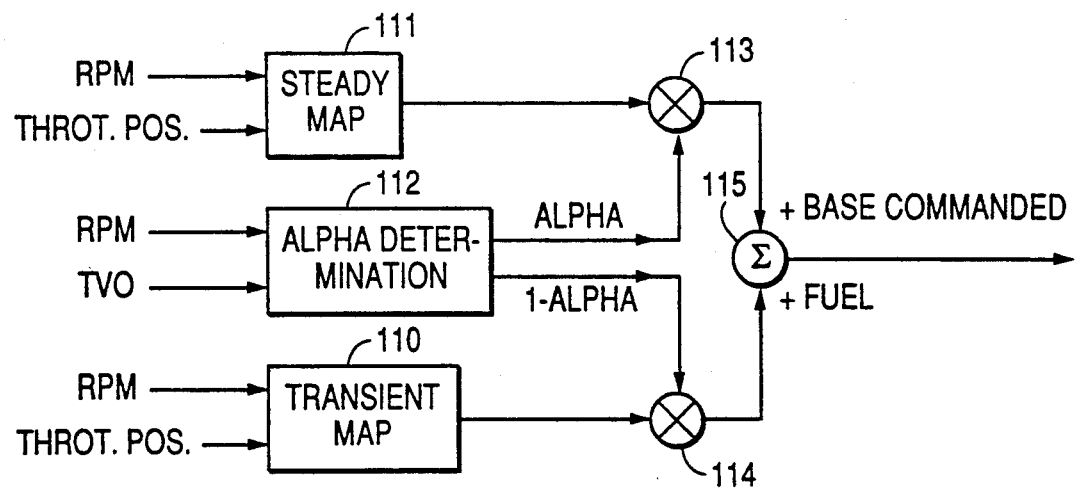

Referring now to FIGS. 2A and 2B, the control system for determining the timing and fueling will be described.

As shown in FIG. 2A, a pair of maps, 100,101, will be utilized for determining the timing calculation, i.e., the time in advance of top dead center (TDC) at which the injection will begin. The map 101 corresponds to steady state conditions, while the map 100 corresponds to more transient conditions. For each timing determination, a timing value is determined for each map for the current speed and fueling information. The fueling information is represented in terms of the time the solenoid valve opens (TVO — time valve opens). Preferably, the fueling information corresponds to the most recent information regarding the actual fueling or, in other words the fueling commanded by the control system, rather than throttle position.

The throttle position is one factor, but is not necessarily a direct indication of the fueling, and therefore the actual fueling value is utilized. For example, as discussed hereinafter, the value of fuel commanded can be determined utilizing maps (similar to the determination of timing) with engine speed and throttle position (operators request) as inputs. In addition, an air fuel control (AFC) fueling value can be determined utilizing a mapped relation with engine speed and intake manifold pressure as inputs. The AFC ensures that the fuel does not exceed that which can be combusted properly given the current air mass flow condition, since where insufficient air is present for a particular fuel amount, black smoke, poor performance and poor efficiency can result. If desired a maximum fueling value may also be determined for high temperatures to prevent overheating. Thus, several fueling values may be determined to ensure that the engine is operating within certain constraints. Generally, the commanded fueling (i.e. the fueling quantity signal actually sent to the injectors) will be the lowest of the values i.e. RPM v. throttle map, AFC, etc. Under certain conditions, the engine may operate on a governor which controls the commanded fueling, for example, to maintain operation within strength/durability constraints of the performance parts where there is determined to be a system failure; for cruise control operation; or to prevent overspeed and underspeed operation of the engine. The fueling contemplated for use in the timing determination, in accordance with the present invention, is the actual commanded fueling, however, the present invention should not be construed as limited to timing determinations using the commanded fueling values, as it would be possible to utilize other indicia of fueling.

The maps 100,101 are three-dimensional maps, with the speed and fueling as inputs, and the resulting timing values as the third-dimension output. A discriminator circuit 102 is also utilized for determining a fourth dimension variable. In particular, the circuit 102 is utilized to determine the control variable (alpha) which is in turn utilized for interpolating between the timing values selected by maps 100,101. The control variable alpha is selected from a three dimensional map utilizing speed and fueling information in a manner described in more detail hereinafter.

Generally, the control variable alpha is selected from a three dimensional map, with values of alpha varying between 0 and 1. If desired, a two dimensional map can be utilized, with alpha based solely on either speed or fueling information (with speed preferred in the two-dimensional case). The map for determining alpha selects a value for alpha of zero for extreme transient conditions and a value of one for steady state conditions. Thus, when alpha is zero, the timing value of map 100 is selected and the timing value of map 101 is selected when alpha is one. For values of alpha between zero and one, alpha is utilized to form proportional quantities of the timing values of maps 100,101. The proportional quantities are summed to form a fuel injector timing value which is, in effect, interpolated between the values obtained from maps 100,101. More specifically, in performing the interpolation, the value of alpha is multiplied by the timing value obtained from map 101 as shown at 103, and the value obtained from map 100 is multiplied by one minus alpha as shown at 104. The values obtained at 103,104 are then summed as shown at 105 to provide the final timing value.

In a similar manner, the fueling can be determined as shown in FIG. 2B. A fueling map 111 is utilized for selecting a fueling value for steady state conditions, based upon speed and throttle position. A corresponding value is also selected from a transient map 110. A value of alpha obtained as in FIG. 2A, is determined as shown at 112, and the corresponding proportional product quantities are determined at 113,114 and summed as shown at 115 to provide a fuel injector fueling value. The use of a pair of fueling tables is currently contemplated to compensate for timing changes (resulting from the FIG. 2A control) such that the net torque remains the same. In other words, upon selection of an optimal (or more nearly optimal) timing value (as illustrated in FIG. 2A) the improved timing does not result in a torque increase, but rather the fueling is adjusted to provide the same torque for a given set of operating conditions. Thus the improved performance resulting from optimized timing is realized in fuel savings. If desired, however, the four dimensional fueling determination may be eliminated, and the four dimensional timing determination can be utilized alone.

The control system receives the sensed information and updates the timing and fueling values after a predetermined interval has elapsed. The value for alpha is also updated, although generally it is not necessary to update the value for alpha as frequently, such that timing and fueling values are interpolated for a predetermined number of intervals utilizing a constant alpha value, with the value for alpha updated after a predetermined number of intervals. For example, the timing and fueling values may be calculated every 16 milliseconds with the value for alpha updated every 192 milliseconds.

Figure 3A:
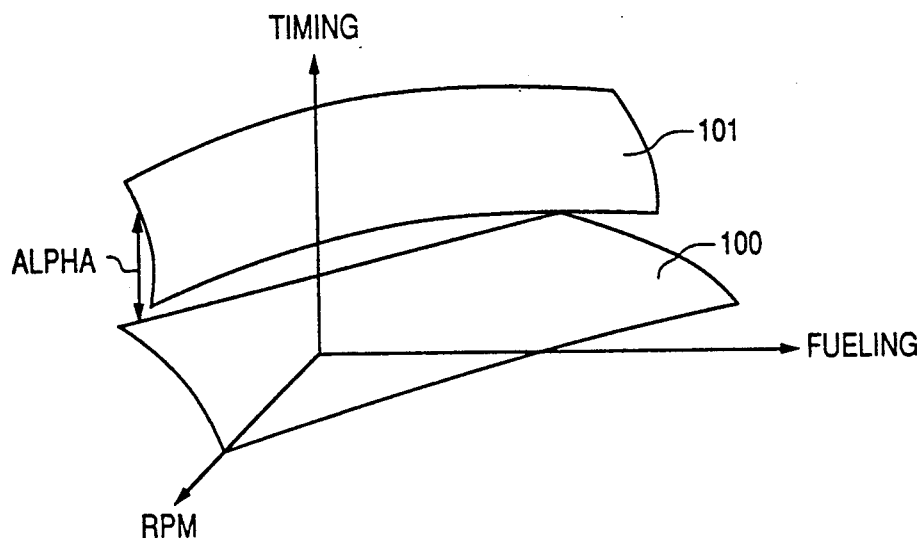
FIGS. 3A and 3B illustrate graphs representing the use of a pair of maps or tables for timing and fueling values.
Figure 3B:
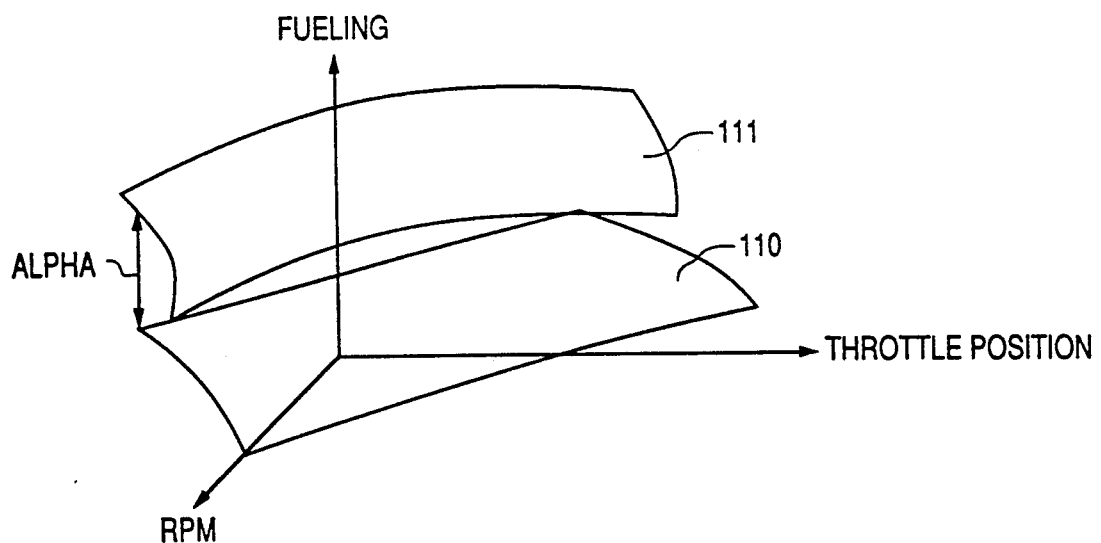

Thus, in accordance with the present invention, as representatively shown in FIGS. 3A and 3B, a pair of mapped relationships are provided which are associated with two operating characteristics (steady state and transient, in the preferred embodiment), for timing (FIG. 3A) and fueling (FIG. 3B). A control variable alpha is then utilized to interpolate between the mapped relations, with alpha acting as a fourth dimensional variable which can be representative of the degree or to what extent qualities of each mode which are present. Thus, a wider range of operating conditions may be provided for, since a range of values lying between the two maps may be provided for rather than simply switching from a steady state map to a transient map. As a result, a large change in fueling or timing values as a result of a small change in operating conditions can be prevented, since the steady state and transient conditions are not isolated. Thus the magnitude of transience or the magnitude of change in conditions can be considered. In addition, as the engine operation is becoming steady state, a rapid shift from the transient map can be prevented if alpha is steadily decreased toward zero, such that the shift from the transient map back to the steady state map can be gradual. Note, that the fueling input variable of FIG. 3A does not necessarily correspond to the fueling output obtained from FIG. 3B, since as mentioned earlier, the actual commanded fueling may result from another fueling algorithm such as an air-fuel control or governor command.

While in the preferred embodiment, maps are utilized corresponding to steady state and transient operational modes, it is to be understood that maps corresponding to other operating modes may be utilized in lieu of or in addition to steady state/transient maps. For example, if desired hot and cold engine operating maps may be utilized, with a control variable provided associated with temperatures, such that conditions between those associated with the hot and cold maps may be considered in interpolating between the maps.

In determining the value for alpha, it is desirable to consider the magnitude of change in operating conditions and to measure this magnitude with respect to the recent operating history of the engine over a predetermined interval. In accordance with one aspect of the invention, it is important to consider the operating conditions over an interval, since if only instantaneous changes are considered, the value for alpha would shift from one (i.e. from the steady state map) for only the first calculation, and then would immediately return back to one upon the next calculation, for example, when the engine speed changes from a first speed to a second speed. Thus, the timing and/or fueling value would shift from the steady state map for the duration of the first alpha calculation, and then would shift immediately back to the steady state map. In accordance with the present invention, the degree of transience is measured with respect to the recent operating history of the engine over a predetermined interval by utilizing fueling and/or speed differences which are measured as the difference between the present values with respect to the average over a previous predetermined interval.

For example, in determining the speed difference, the instantaneous speed is compared with the average speed over a previous period of time. After a change from a first steady speed to a second steady speed, the average speed will initially be the first steady speed and gradually will become the instantaneous speed of the second steady speed such that an initial large speed difference (more transient) results, followed by the speed difference gradually returning to zero (indicative of steady state operation). As an illustration, if the engine is operating at a constant speed of 1,000 RPM, and the speed is averaged over a succession of ten intervals for providing an average speed in the speed difference calculation, and operation is suddenly changed to 2,000 RPM, the first determination of alpha will utilize a speed difference of 2000-1000=1000. Upon the next alpha determination, the average speed would include nine 1000 RPM values and a first 2000 RPM value, such that the average speed would become 1100 and the speed difference utilized in determining the updated alpha would be 900 RPM. Gradually, the average speed will become 2000 RPM and the speed difference will become zero. The preceding example is merely illustrative and not intended to demonstrate an actual averaging and speed difference determining operation. In actuality, the average will include significantly more than ten values and, as would be recognized by one skilled in the art, a speed change from 1000 to 2000 RPM would not occur instantaneously and intermediate speeds would occur and be utilized in the speed average difference calculations. Thus, in accordance with the present invention, after a speed change, a transient condition will be recognized, with the control variable alpha selected depending on the magnitude of the change, such that the timing and/or fueling value will shift away from the steady state map so that the timing and (optionally) fueling can accommodate the transient condition of the engine operation.

The steady state map will tend to be more aggressive, with respect to performance, fuel efficiency, and stress limits of engine components, for example, by providing more advanced timing, or in other words, earlier injection of the fuel (relative to top dead center), since in steady state operation, the response can be more predictable. This is represented generally as shown in FIG. 3A with the steady state map above the transient map demonstrating more advanced timing. Note however, the timing of the steady state map need not necessarily be advanced of the transient map under all conditions and it is possible that for certain conditions the transient timing map value will be advanced or the same as that of the steady state map value. However, the steady state map is illustrated as advanced of the transient map since this is the currently recognized general tendency. Upon occurrence of a transient condition, the operation will shift away from the steady state map toward the more conservative transient map for the particular new set of operating parameters, and will gradually move toward the steady state map and reach the steady state map as the average fueling and/or speed becomes equal to the instantaneous new steady state condition.

Figure 4:
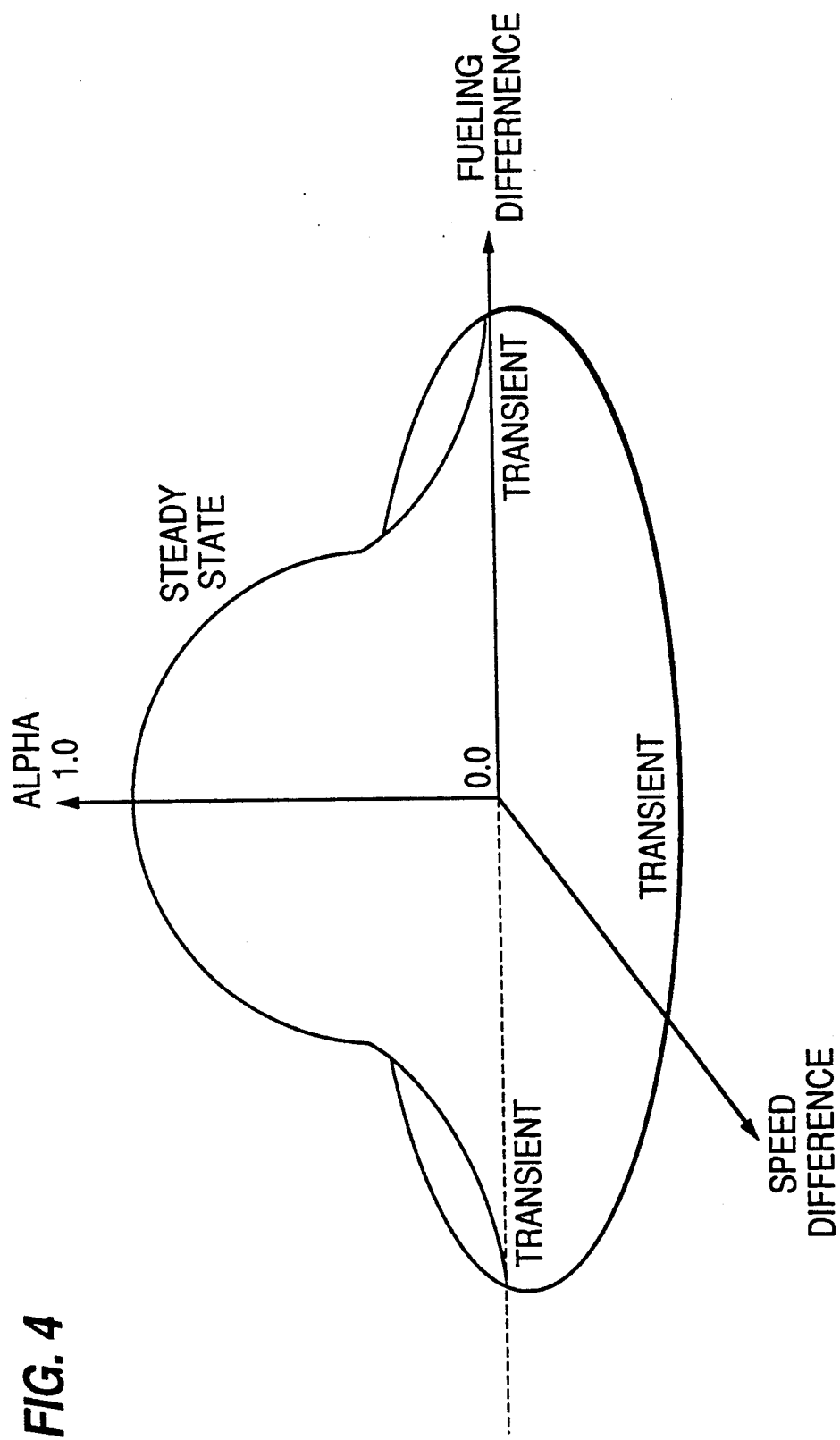
FIG. 4 illustrates a map for selecting the control variable which is utilized for interpolating between maps of FIGS. 3A and 3B.

After the fuel and speed differences are determined, alpha is selected utilizing a mapped relation, for example, as shown in FIG. 4. Note that while the FIG. 4 embodiment includes a three dimensional map for selecting alpha, with alpha dependent upon fueling and speed differences, as discussed earlier it is possible and contemplated within the scope of the present invention to utilize a two dimensional map in determining alpha, with only the speed difference or fueling difference utilized as the input.

As shown in FIG. 4, where the fueling and speed differences are zero, an alpha value of one is obtained, representative of steady state operation. As the speed and/or fuel differences increase, the value of alpha moves toward zero representing transient conditions are present. The relationship shown in FIG. 4 is for representative purposes only, and is not to be construed as illustrating a specific mathematical relationship for alpha.

While graphical surfaces have been illustrated for the mapped relations, the map surfaces will generally take the form of tables or look up charts having a matrix of values, with values between the charted values interpolated where the actual input values fall between the charted input values. Where three dimensional maps are utilized and both input values fall between charted inputs, known three dimensional interpolation techniques can be utilized.

The value of alpha may thus be obtained utilizing fueling and/or speed differences as inputs. However, in accordance with the present invention, a more sophisticated determination of alpha may be utilized, such that under certain conditions an alternative value is utilized in selecting the control variable alpha for interpolating between mapped timing and/or fueling values.

Figure 5:
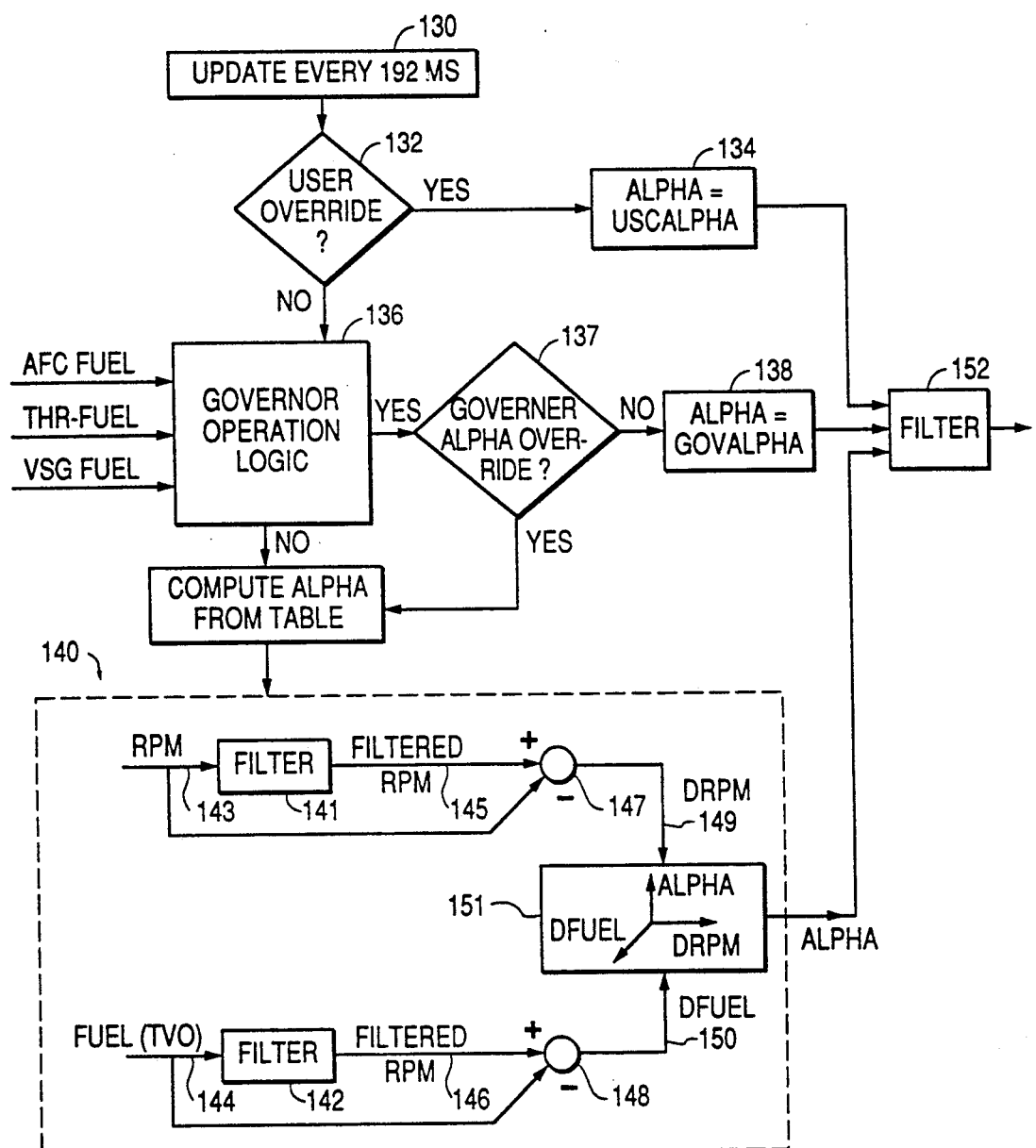
FIG. 5 is a flow diagram illustrating the logic for selecting the control variable.

In the system shown in FIG. 5, alpha is not selected from the map (FIG. 4) if an operator desires to utilize an override. If the user desires to override the mapped alpha, alpha is set to a constant, but calibratible, value. In addition, even where the operator does not select the override, an automatic override may be actuated if the engine is operating on a governor. When the engine is operating on a governor, alpha will be set equal to a second constant value which is also calibratible. The user override is not currently contemplated to be accessible or calibratible by a typical user i.e. truckdriver, as it may allow the user to operate the engine outside government emissions requirements. However, the user calibrated alpha override may have beneficial uses in engine testing applications.

As shown at 130, the determination of alpha is updated periodically, for example, every 192 milliseconds. As noted earlier, the determination of the timing and fueling values (i.e., determined from the maps utilizing sensed information and interpolated utilizing alpha) for a given alpha would generally be updated much more frequently than the value of alpha, for example, every sixteen milliseconds for timing and fueling determinations, with alpha updated every 192 milliseconds.

The initial determination is whether the user has chosen to override alpha as indicated at 132. If the user has chosen to override alpha, alpha is set to a calibrated value USCALPHA (User Commanded Alpha) at 134. The USCALPHA value is then utilized for interpolating between maps (e.g. FIGS. 3A and 3B) until a subsequent update of alpha. If the user has not activated the override, the control system next determines whether the engine is operating on any governor at 136. If the engine is operating on any governor, alpha is set to a second calibratible constant GOVALPHA (Governer Alpha) at 138, (with this alpha utilized for interpolation between the mapped values for timing and/or fueling), unless a governor alpha override is on at 137. If it is determined at 136 that the engine is not operating on a governor, or if the override at 137 is on, alpha is determined utilizing the fuel difference and/or speed difference values, by selecting the corresponding mapped value as discussed earlier and as shown generally at 140. It is currently contemplated that the governor alpha override 137 would be preprogrammed at the manufacturer, where it is not desired to utilize a separate constant alpha for governor operation on certain engines or for certain engine applications. However, it also would be possible to provide an actuator or switch to allow a mechanic or operator to determine when to activate the governor alpha override 137.

As shown at 140 the speed and fueling difference values can be determined utilizing filters 141,142. The instantaneous speed and fueling value signals 143,144 are input to the filters which provide average speed and fueling signals 145,146. The average and instantaneous signals are the subtracted (147,148), and the difference signals 149,150 are utilized to determine alpha using a map as shown at 151. While the fueling and speed signals 143,144 are referred to as instantaneous, they are actually filtered as would be understood by one skilled in the art. Filtering eliminates noise (or erroneous sensing of marks in measuring camshaft and/or crankshaft rotation) and provides a signal over a period on the order of several milliseconds. The signals 143,144 are thus substantially instantaneous, particularly when viewed in relation to the averaged signals 147,148, which provide average speed and fueling values over a time period on the order of 10-60 seconds. If desired, the alpha values can also be filtered as shown at 152, to prevent rapidly fluctuating values of alpha.

The logic for determining whether the engine is operating on any governor will now be described. Reference to "on a governor" may be somewhat of a misnomer, since certain governor conditions may be treated as not being on a governor. For example, often an engine will be equipped with a variable speed governor which allows the operator to utilize the throttle pedal as a speed control, rather than a fuel control. With the variable speed governor (VSG), the operator thus controls the speed (or requests a speed) by positioning of the throttle pedal. While this speed control utilizes a governor, it will be treated as not on a governor for the purpose of selecting alpha, since the operator maintains control by position of the throttle pedal. As used herein, the operation "on a governor" will generally be utilized to indicate that the fueling command is not being varied or controlled by the operator varying the position of the pedal or throttle.

Figure 6:
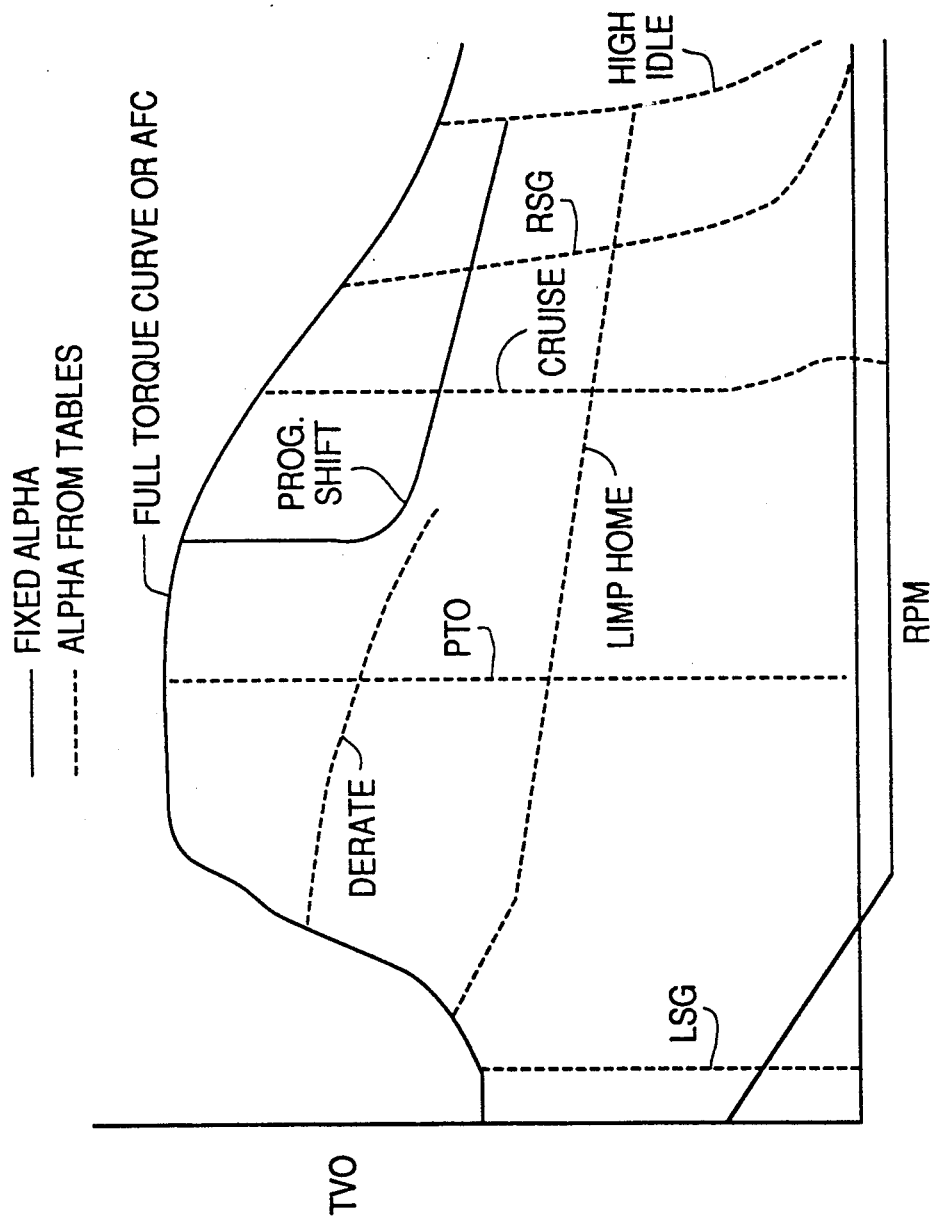
FIG. 6 shows a map of a variety of engine operating modes and illustrates the dependence of the control variable on the operating mode.

FIG. 6 graphs fueling (TVO) v. engine speed (RPM) and illustrates various operating conditions or profiles for which the engine is operating on the governor and not on the governor. The conditions for which a fixed (but calibratible) alpha will be utilized are shown in broken lines, while the conditions for which alpha maps or tables are utilized are shown in solid lines. It should be recognized that FIG. 6 is not intended to limit the number of governor or non-governor operating conditions and it clearly does not depict all conditions necessary to cause an engine to be operating on a governor. Rather, FIG. 6 simply illustrates the fueling and speed characteristics for various governor and non-governor operations.

As shown in FIG. 6, there can be numerous situations where an engine is operating on a governor. For example, when the engine is operating at high speeds, a high speed governor or high idle governor can control the engine operation to prevent overspeed operation, thereby preventing damage or excessive wear of various engine or drive train components. A road speed governor (RSG) can be activated where the vehicle road speed becomes high (i.e. traveling speed—not engine speed), to prevent operation of the vehicle at high road speeds The use of a road speed governor can be important to a manufacturer or a fleet owner of trucks, where it is desired to prevent the operators from operating the engine at dangerous and excessive speeds.

A further type of governor which is commonly present is a cruise control, which allows the operator to maintain a constant road speed without controlling the throttle pedal. In a power takeoff mode (PTO) the engine is being utilized other than for the purpose of driving a vehicle, for example, to unload a dump truck, or operate another piece of machinery. In this mode, a governor is utilized to control speed or power provided by the engine. A low speed governor (LSG) is also usually provided, to prevent operation below certain speeds, thereby preventing shutoff of the engine.

Yet another governor may be provided which acts to limit fueling across a wide range of engine speeds. This governor, referred to in FIG. 6 as the limp home governor, can be activated where the engine senses a problem in the basic fuel control system or in sensing elements utilized to control the fuel system. The limp home system thus serves two functions, by allowing only limited performance during system failures such that damage to the engine is prevented, and also by encouraging the operator to seek repairs, as the operator will readily recognize the poor power or performance and will realize that maintenance is needed. A derate governor can also be utilized where certain sensed operating conditions are undesirable. In contrast to the limp home, in the derate governor, the control and sensing systems are operating properly, however, the conditions which are sensed are deemed improper. For example, where the oil or water temperatures are extremely high, the derate governor can operate to limit the fuel provided to the engine, to prevent overheating.

In situations where governors as described above are not utilized, the value for alpha is selected from maps or tables. Generally, in a situation where the engine is not operating on a governor, the fueling will correspond to that from fueling v. RPM curve, or other control table, which represents the full torque or full throttle curve. Alternatively, the fueling may be controlled for a particular speed and intake manifold pressure or boost pressure, such that the amount of fuel does not exceed the available air for combustion. While represented as a line in FIG. 6, the full torque curve can include a range of values, for example in the situation where a pair of fuel maps are utilized with alpha used to interpolate between fueling tables or maps (FIG. 3B). Where the fueling values are from an AFC (air fuel control) or full throttle curve, the alpha is selected from maps or tables.

Another situation or algorithm in which alpha is determined from the table is indicated by the progressive shift line. Often, when an engine is operating at an improper gear, at higher speeds the allowed fueling will be lowered, thereby providing an indication to the operator to shift gears, and preventing full torque at high speeds in an improper gear. The progressive shift algorithm is a modification of the full torque or full throttle curve, and typically utilizes a variable speed governor, and therefore the mapped or tabulated alpha is selected. A number of additional partial throttle curves (not shown) may also be represented corresponding to the fuel commanded for a given engine speed for a particular throttle position (e.g. 50% full throttle, 12% full throttle, etc.). The partial throttle curves would be roughly the same shape or contour as the full throttle curve, but would be shown at lower positions relative to the full throttle curve in FIG. 6. The full throttle curve and the partial throttle curves actually correspond to columns in a look-up chart or table which provide a fueling value for a particular engine speed at a given throttle position. Interpolating can be performed for speed and throttle position values between the charted values. Where the fueling is determined from the speed-throttle position (full or partial) charts, alpha is determined from the tables.

It is readily apparent from FIG. 6 that numerous operations or algorithms are possible for operations on a governor and not on a governor. Each of the lines representing operation on a governor corresponds to a separate algorithm which controls the fueling when certain conditions are satisfied. Applicants have recognized that logic for the determination of whether operation is on a governor is simplified by reference to when the engine is not operating on a governor. If fueling conditions are present which deviate from non-governor operation, it is assumed that operation is on a governor. Operation will be considered not on the governor where: (1) the commanded fuel is equal to the AFC (air fuel control) fuel, or in other words, that which would be the maximum fuel allowed by the AFC tables for a particular intake manifold pressure; (2) the commanded fuel is equal to the fuel commanded by the variable speed governor; (3) the commanded fuel is equal to the fuel commanded by the full throttle curve for the current engine speed; or (4) the commanded fuel is equal to the fuel commanded by one or more partial throttle curve(s) at the current engine speed. If any one of the four conditions is met, it is determined that the engine is not operating on a governor. As noted earlier, the progressive shift algorithm utilizes a variable speed governor and therefore alpha would be calculated from the tables. In addition, sometimes the power take-off (PTO) throttle is overridden, with the operator controlling the power take-off with the throttle pedal. This operation also utilizes the variable speed governor, and therefore alpha would be calculated from the tables.

Industrial Applicability

The present invention provides controlling of fuel injection based on the recent operating history of the engine. In particular, the current fueling and/or speed is compared with the average fueling and/or speed over a predetermined period, with the speed and fueling differences utilized in determining a control variable. The control variable is then utilized for interpolating between maps representative of different operating conditions or modes, for example, steady state and transient. Thus, the determination of appropriate timing and/or fueling can be determined with reference to operation of the engine over a previous predetermined period, and the magnitude of the difference between the current operating conditions and the previous operating conditions. Where the engine is operating on a governor, the control variable can be set to a fixed, but calibratible value for interpolation between operating maps. The present invention can provide for accommodation of a wider range of operating conditions, in selecting timing and/or fueling commands for control of engine fuel injection. Thus, the commanded timing and/or fueling can be more particularly suited for the engine operating conditions, and the timing and/or fueling values can better accommodate trade offs with regard to performance, economy, emissions and durability.

What is claimed:

1. A fuel injection control system for controlling operation of a fuel injector in an engine comprising:
    speed indicator means for providing a signal indicative of engine speed;
    fueling indicator means for providing a signal indicative of fuel quantity;
    first timing selection means for selecting a first timing value in response to speed and fueling signals according to a first timing determining function;
    second timing selection means for selecting a second timing value in response to the speed and fueling signals utilized in determining said first timing value according to a second timing determining function different from said first timing determining function;

means for determining a control variable as a function of engine operating conditions;

fuel injector timing determining means for variably determining an injector timing value from said first and second timing values based on the value of said control variable.

2. The fuel injector control system of claim 1, wherein the means for determining the control variable includes speed difference calculating means for calculating a speed difference between current engine speed and an average engine speed over a previous predetermined period and wherein the control variable is determined based upon the calculated speed difference.

3. The fuel injector control system of claim 2, wherein the means for determining the control variable determines the control variable from a two-dimensional map, with the speed difference as a first dimension input and the control variable as a second dimension output.

4. The fuel injector control system of claim 3, wherein the control variable is selected from the range of zero to one.

5. The fuel injector control system of claim 2, wherein the control variable determining means determines the control variable to be one when the speed difference is zero.

6. The fuel injector control system of claim 1, wherein the means for determining the control variable includes speed difference calculating means for calculating a speed difference between current engine speed and an average engine speed over a previous predetermined period, the means for determining the control variable further including fueling difference calculating means for calculating a fueling difference between current fueling and an average fueling over a previous predetermined period, and wherein the control variable is determined based on the speed and fueling differences.

7. The fuel injector control system of claim 6, wherein the means for determining the control variable determines the control variable from a three-dimensional map, with the speed and fueling differences as first and second dimension inputs, and the control variable as a third dimension output.

8. The fuel injector control system of claim 7, wherein the control variable is selected from the range of zero to one.

9. The fuel injector control system of claim 6, wherein the control variable determining means determines the control variable to be one when the speed difference and the timing difference are zero.

10. The fuel injector control system of claim 1, wherein the control variable is selected from the range of zero to one.

11. The fuel injector control system of claim 10, wherein the timing determining means determines the first timing value as the injection timing value where the control variable is zero, and determines the second timing value as the injection timing value where the control variable is one.

12. The fuel injector control system of claim 11, wherein the fuel injector timing determining means includes means for calculating the injector timing as the sum of first and second products, wherein the first product which comprises the first timing value multiplied by the sum of one minus the control variable, and the second product which comprises the second timing value multiplied by the control variable.

13. The fuel injector control system of claim 1, wherein said control variable determining means includes governor determining means for making a determination as to whether engine operation is on a governor or not on a governor and for causing the control variable to be set to a fixed value in response to a determination that the engine is operating on a governor, and for causing selection of the control variable from a map in response to a determination that the engine is not operating on a governor.

14. The fuel injector control system of claim 13, wherein the governor determining means compares current fueling to a fueling value from an air-fuel control system and wherein the governor determining means determines the engine is not operating on a governor when the current fueling corresponds to the air-fuel control fueling value.

15. The fuel injector control system of claim 13, wherein said governor determining means compares current fueling with a fueling value from a variable speed governor and wherein the said governor determining means determines the engine is not operating on a governor when the current fueling corresponds to the variable speed governor fueling value.

16. The fuel injector control system of claim 13, wherein the governor determining means compares current fueling with a fueling value from a full throttle table and wherein the governor determining means determines the engine is not operating on a governor when the current fueling corresponds to the full throttle table fueling value.

17. The fuel injector control system of claim 13, wherein the governor determining means compares current fueling with a fueling value from full and partial throttle tables and wherein the governor determining means determines the engine is not operating on a governor when the current fueling corresponds to the fueling value from the full and partial throttle tables.

18. The fuel injector control system of claim 13, wherein the control variable determining means further includes governor determining override means for causing selection of the control variable from a map when the override is on despite a determination that the engine is operating on a governor, and wherein the control variable is set to a fixed value in response to a determination that the engine is operating on a governor when the override is off.

19. The fuel injector control system of claim 1, wherein the control variable determining means includes user override means for setting the control variable to a first fixed value when the user override means is on.

20. The fuel injector control system of claim 19, wherein the control variable determining means includes governor determining means for making a determination as to whether engine operation is on a governor or not on a governor and for causing selection of the control variable from a map when the user override is off and it is determined the engine is not operating on a governor;

said governor determining means including governor determining override means, wherein when the governor determining override means "on", the governor determining means causes the selection of the control variable from the map when the user override is off and it is determined that the engine is operating on a governor; the governor determining means causing the control variable to be set to a second fixed value when governor determining override means is off, the user override is off and it is determined that the engine is operating on a governor.

21. The fuel injector control system of claim 1, further including:
throttle position indicating means for producing a signal indicative of throttle position;
first fueling selecting means for selecting a first fueling value in response to speed and throttle position signals;
second fueling selecting means for selecting a second fueling value in response to the speed and throttle position signals utilized in determining said first fueling values; and
fuel injector fueling determining means for determining the fueling of the fuel injector based on said control variable and said first and second fueling values.

22. The fuel injector control system of claim 21, wherein the fuel injector timing determining means includes means for calculating the injector timing as the sum of first and second timing products, the first timing product comprising the first timing value multiplied by the sum of one minus the control variable, the second timing product comprising the second timing value multiplied by the control variable;
said fueling determining means comprising means for calculating the injector fueling as the sum of first and second fueling products, the first product comprising the first fueling value multiplied by the sum of one minus the control variable, the second product comprising the second fueling value multiplied by the control variable.

23. The fuel injector control system of claim 1, wherein the first timing selecting means includes a first map for providing timing values for extreme transient conditions, and said second timing selecting means includes a second map for providing timing values for steady state conditions.

24. A system for controlling operation of a fuel injector in an engine comprising:
a first timing map for providing a first set of timing data;
a second timing map for providing a second set of timing data;
first timing value selecting means for selecting a first timing value from said first timing map based on current engine operating conditions;
second timing value selecting means for selecting a second timing value from said second map based on current engine operating conditions;
control variable determining means for determining a control variable as a function of engine operating conditions; and
fuel injector timing determining means for variable determining fuel injector timing from said first and second timing values based on the value of said control variable.

25. The system of claim 24, the control variable determining means comprising:
speed difference means for determining the difference between current engine speed and an average engine speed over a previous predetermined period, said control variable determining means further including a control variable map having control variables corresponding to speed difference values, wherein said control variable is selected from the control variable map for a determined speed difference.

26. The system of claim 25, wherein the range of values of the control variable map is zero to one, and wherein the timing determining means determines the first timing value as the fuel injector timing when the control variable is zero and determines the second timing value as the fuel injector timing when the control variable is one.

27. The system of claim 24, wherein said first and second timing maps are three dimensional maps each including speed and fueling inputs, said system including engine speed indicating means and fueling indicating means for providing signals indicative of engine speed and fueling, wherein said first and second timing value selecting means respectively select the first and second timing values from said first and second maps corresponding to the speed and fueling indicated by the speed and fueling signals.

28. The fuel injector system of claim 24, wherein the first timing map provides timing data for extreme transient conditions, and said second timing map provides timing data for steady state conditions.

29. The system of claim 28, further including:
a first fueling map for providing a first set of fueling data;
a second fueling map for providing a second set of fueling data;
first fueling value selecting means for selecting a first fueling valve from said first fueling map;
second fueling value selecting means for selecting a second fueling value from said second fueling map; and
fuel injector fueling determining means for determining fueling of the fuel injector based on said control variable and said first and second fueling values.

30. The system of claim 29, wherein the control variable is selected from a range of values of zero to one, and wherein the control variable determining means determines the control variable as one under steady state conditions, and determines the control variable as zero for extreme transient conditions;
said fuel injector timing determining means including means for determining the fuel injector timing as a sum of first and second timing products, wherein the first timing product comprises the first timing value multiplied by the sum of one minus the control variable, and the second timing product comprises the second timing value multiplied by the control variable;
said fuel injector fueling determining means including means for determining the fuel injector fueling as a sum of first and second fueling products, wherein the first product comprises the first fueling value multiplied by the sum of one minus the control variable, and the second fueling product comprises the second fueling value multiplied by the control variable.

31. A fuel injector system including an electronic control for controlling timing and fueling operations of a plurality of fuel injectors the electronic control comprising:
first timing value means for providing first timing values for extreme transient engine operation;
second timing value means for providing second timing values for steady state engine operation; and fuel injector timing determining means for determining fuel injector timing based on first and second timing values from said first and second timing value means, said fuel injector timing determining means including interpolating means for interpolating between respective first and second timing values of said first and second timing value means.

32. The fuel injector system of claim 31, wherein said interpolating means interpolates between said first and second timing values based on engine operating speed information.

33. The fuel injector system of claim 32, wherein said interpolating means determines a speed difference between current engine speed and an average engine speed over a previous predetermined period, wherein said fuel injector timing determining means determines the fuel injector timing as the second timing value when the difference is zero and the timing becomes closer to that of the first timing value as the difference increases.

34. The fuel injector system of claim 31, wherein the interpolating means interpolates between said first and second timing values based on engine operating speed and engine fueling information.

35. The fuel injector system of claim 34, wherein the interpolating means determines a speed difference between current engine speed and an average engine speed, and wherein said interpolating means further determines a fueling difference between current fueling and an average fueling over a previous predetermined period, said interpolating means interpolates between the first and second timing values based on said timing and fueling differences.

36. The fuel injector system of claim 33, wherein said fuel injector timing determining means includes an user actuated override and wherein said interpolating means interpolates the fuel injector timing as fixed proportions of said first and second timing values when the override is on.

37. The fuel injector system of claim 33, further including governor determining means for making a determination of whether engine operation is on a governor or not on a governor, wherein said interpolating means interpolates the fuel injector timing as fixed proportions of said first and second timing values in response to a determination of engine operation on a governor.

38. A fuel injector system having electronically controlled fuel injectors in which an electronic control unit receives signals which indicate operating conditions of the engine and said electronic control unit controls injection timing and fueling in response to the signals, the system comprising:
  speed indicator means for producing a signal indicative of engine speed;
  throttle position indicating means for producing a signal indicative of throttle position; and
  an electronic control unit comprising:
  (a) signal receiving means for receiving engine speed and throttle position signals;
  (b) signal transmitting means for transmitting timing signals for controlling fuel injector timing, and fueling signals for controlling fuel injector fueling;
  (c) fueling determining means for determining the fuel quantity to be injected and producing fueling signals for transmission by said signal transmitting means for commanding fuel injector fueling;
  (d) timing determining means for determining fuel injector timing and producing a timing signal for transmission by said transmitting means; said timing determining means including averaging means for determining an average engine speed over a predetermined period and speed difference means for determining a speed difference between current engine speed and the average engine speed, said timing determining means further including:
    (i) means for selecting an interpolating control variable based on the speed difference;
    (ii) first timing value means for producing a first timing value based on current commanded fueling produced by the fueling determining means, said first timing value further based on current engine speed as indicated by said speed indicating means;
    iii) second timing value means for producing a second timing value based on current commanded fueling produced by the fueling determining means, said second timing value further based on current engine speed as indicated by said speed indicating means;
  wherein said timing determining means utilizes said interpolating control variable for interpolating between said first and second timing values.

39. The fuel injector system of claim 38, wherein said fueling determining means of said electronic control unit further includes:
  (a) first fueling value means for producing a first fueling value based on engine speed throttle position; and
  (b) second fueling value means for producing a second fueling value based on engine speed and throttle position;
  wherein said fueling determining means utilizes said control variable for interpolating between said first and second fueling values based on the control variable to produce a fuel injector fueling signal.

40. The fuel injector system of claim 39, wherein said fueling determining means includes at least one governor for producing overriding fueling signals which override fueling determined based on said first and second fueling values.

41. The fuel injector system of claim 40, further including governor determination means for making a determination of engine operation on a governor and engine operation not on a governor, said governor determination means causing said means for selecting an interpolating control variable to set the interpolating control variable to a predetermined fixed value in response to a determination of engine operation on a governor.

42. The fuel injector system of claim 41, wherein said fueling determining means includes a variable speed governor, and wherein said governor determination means makes a determination of engine operation not on a governor when fueling is controlled by said variable speed governor.

43. The fuel injector system of claim 38, wherein said means selecting an interpolating control variable updates the control variable periodically and the timing determining means updates the timing periodically, wherein the time period between updates of the interpolating control variable is greater than the time period between updates of the fuel injector timing.

44. The fuel injector system of claim 43, further including filter means for filtering the interpolating control variable to prevent large fluctuations from one updated interpolating control variable to a next updated interpolating control variable.

45. A method for controlling fuel injector operation in a fuel injector system of an engine comprising the steps of:
   selecting a first timing value based on engine operating conditions according to a first timing determining function;
   selecting a second timing value based on engine operating conditions according to a second timing determining function different from said first timing determining function;
   determining a control variable based on current engine operating conditions; and
   determining fuel injector timing based on a weighted summation of said first and second timing values, said values weighted variably in said summation according to the value of said control variable.

46. The method of claim 45, wherein said control variable is selected from a range of zero to one, and wherein the fuel injector timing is determined as the first timing value when the control variable is zero, and said fuel injector timing is determined as the second timing value when the control variable is one, and wherein the fuel injector timing is interpolated between said first and second timing values when the control variable is between zero and one.

47. The method of claim 46, wherein the step of determining the control variable includes determining a speed difference between a current engine speed and an average engine speed over a predetermined period, and determining a fueling difference between current commanded engine fueling and a fueling average over a predetermined period, the step of determining a control variable further including providing a three dimensional map having speed difference and fueling difference inputs and selecting the control variable based on the determined speed and fueling differences.

48. The method of claim 46, wherein the step of determining a control variable includes determining an average engine speed over a predetermined period and determining a speed difference between current engine speed and the average engine speed, the step of determining the control variable further including providing a map of control variable values for corresponding speed difference values and selecting a control variable for the determined speed difference.

49. The method of claim 47, wherein the steps of selecting first and second timing values includes providing first and second three dimensional maps each having engine speed and fueling as inputs; and
   selecting the first and second timing values from said first and second maps corresponding to current engine speed and fueling.

50. The method of claim 49, further including determining fuel injector fueling by:
   selecting a first fueling value from a first fueling map based on engine speed and throttle position;
   selecting a second fueling value from a second fueling map based on engine speed and throttle position; and
   determining fueling based on said first and second fueling values and said control variable.

51. The method of claim 50, wherein said first timing map corresponds to transient engine operation and said second timing map corresponds to steady state engine operation.

52. The method of claim 51, wherein the first fueling map corresponds to transient engine operation, and the second fueling map corresponds to steady state engine operation.

* * * * *